United States Patent [19]

Tsuchida

[11] Patent Number: 4,730,372

[45] Date of Patent: Mar. 15, 1988

[54] APPARATUS FOR FABRICATING BLIND

[75] Inventor: Kazuo Tsuchida, Shiga, Japan

[73] Assignee: Tachikawa Corporation, Japan

[21] Appl. No.: 892,904

[22] Filed: Aug. 4, 1986

[30] Foreign Application Priority Data

Aug. 21, 1985 [JP] Japan ................................ 60-183474

[51] Int. Cl.[4] ................................................ B23P 19/04

[52] U.S. Cl. .................................... 29/24.5; 29/564.2; 29/564.6; 29/564.8; 29/650; 29/701

[58] Field of Search ................... 29/24.5, 564.1, 564.2, 29/564.6, 564.8, 650, 701

[56] References Cited

U.S. PATENT DOCUMENTS 3,531,838 10/1970 Peeters ................................ 29/24.5
3,736,631 6/1973 Edixhoven ........................... 29/24.5
3,766,815 10/1973 Edixhoven ........................... 29/24.5
4,188,693 2/1980 Edixhoven ........................... 29/24.5
4,514,886 5/1985 Edixhoven ........................... 29/24.5
4,543,699 10/1985 Anderson ............................ 29/24.5
4,615,087 10/1987 Chang ................................. 29/24.5

*Primary Examiner*—Carl E. Hall
*Attorney, Agent, or Firm*—Ostrolenk, Faber, Gerb & Soffen

[57] ABSTRACT

An apparatus for fabricating a blind. This blind fabricating apparatus is constituted by: input devices for inputting a height of the blind and a length of a slat; an arithmetic and logic means for computing the number of steps of the slats which corresponds to the inputted height of the blind and positions at which insertion holes for an ascending-descending cord are formed in the slats on the basis of output signals of the input devices; and a slat inserting device for cutting the slat material to a predetermined length, forming the insertion holes for the ascending-descending cord in the slats, and inserting the slats through a plurality of ladder cords.

13 Claims, 15 Drawing Figures

APPARATUS FOR FABRICATING BLIND

BACKGROUND OF THE INVENTION

1. Field of the Invention

The present invention relates to an apparatus for fabricating a blind which is desined for inserting slats of the blind through ladder cords.

2. Description of the Related Art

On the occasion when inserting a plurality of slats through a ladder cord to fabricate a blind according to a conventional method, the slats are cut beforehand to a predetermined length, and these slats are manually inserted through the ladder cord which is supportingly suspended by a pole, the above-described slats being formed with insertion holes through which to insert ascending-descending cord. Such operations to insert the slats are, however, extremely inefficient. Under such circumstances, there is proposed an apparatus for fabricating a blind with a view to rationalizing the slat inserting operations. This kind of apparatus involves the following steps. Upon every initial setting of operations in accordance with a desired height of the blind and a desired length of the slat, the slats are arranged to be inserted in due order through the ladder cord which slats are previously cut to the predetermined length and at the same time are, at given positions, formed with holes through which to insert the ascending-descending cord.

The above-described conventional apparatus for fabricating a blind needs to previously compute and input the number of steps of the slats which corresponds to the height of the blind and positions as well at which to form the holes designed for insertion of the ascending-descending cord which positions correspond to the length of the slat for the purpose of performing the initial setting in accordance with the desired height of the blind and the desired length of the slat, or needs to provide other positioning device. Hence, in case of fabricating multiple blinds which differ in height and include slats with different lengths, the aforementioned initial setting requires much labor, this conducing to a problem in which fabrication of the blind cannot be sufficiently rationalized.

SUMMARY OF THE INVENTION

Accordingly, it is a primary object of the present invention to provide an apparatus for fabricating a blind which is capable of inserting slats through a ladder cord with the aid of a slat inserting device on the basis of data obtained by automatically computing both the number of steps of slats of the blind and positions at which insertion holes for ascending-descending cord are formed.

To this end, according to one aspect of the invention, there is provided an apparatus for fabricating a blind wherein at the time of inserting the slats through the ladder cord the slats are smoothly inserted through the ladder cord without being caught therein.

According to another aspect of the invention, there is provided an apparatus for fabricating a blind wherein, at the insertion of the slats through the ladder cord, a guide means for guiding the slats and a slat shifting means for shifting the slats that are inserted through the ladder cord are driven by the same driving means thereby to simplify this driving means, and wherein the above-described guide means and the shifting means suffer no deviation in operational timing.

According to still another aspect of the invention, there is provided an apparatus for fabricating a blind wherein the ladder cord can constantly be disposed in the vicinity of the insertion holes for the ascending-descending cord, and it is feasible to prevent the slats from falling off out of the ladder cord.

According to a further aspect of the invention, there is provided an apparatus for fabricating a blind wherein it is possible to adequately interlock lateral strings of the ladder cord with a tension imparting means without any deviation therefrom, the tension imparting means imparting downward tension to the ladder cord.

To accomplish the above-described objects, the apparatus for fabricating a blind according to the present invention is constituted by: input devices for inputting a height of the blind and a length of the slat; an arithmetic and logic means for computing both the number of steps of slats which corresponds to the inputted height of the blind and positions at which insertion holes for the ascending-descending cords are formed in the slats; and a slat inserting device for forming the slats including insertion holes for the ascending-descending cord which are formed at given positions and for inserting the slats through the ladder cord by a given number of steps, such slat-formation requiring a prerequisite step in which a slat material is cut to a predetermined length on the basis of the outputs of the arithmetic and logic means.

Other and further objects of the present invention will become apparent upon an understanding of the illustrative embodiments which will hereinafter be described or will be indicated in the appended claims, and various advantages that are not referred to herein will occur to those skilled in the art upon comprehension of the invention.

DETAILED DESCRIPTION OF THE PREFERRED EMBODIMENTS

Figure 2:
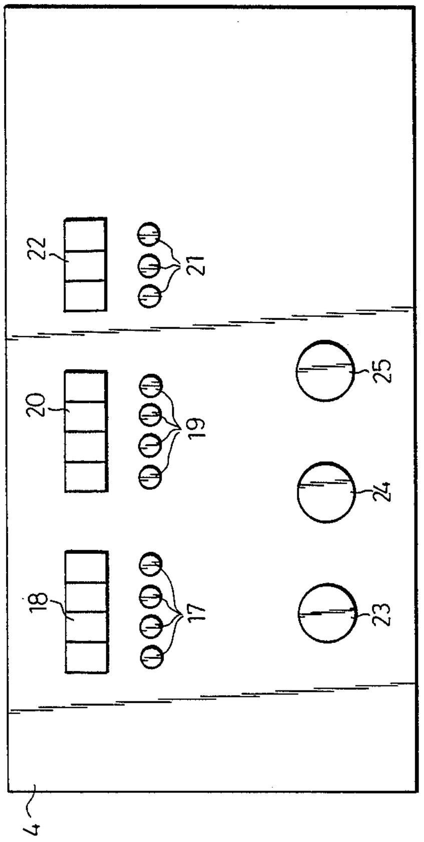
FIG. 2 is an elevational view of a controller thereof.

One embodiment to which the present invention is materialized will hereinafter be described with the reference to the accompanying drawings. It can be observed from FIG. 1 that a blind fabricating apparatus 1 consists of: a molding equipment 2 for molding a tabular slat into a crooked shape; a slat inserting device 3 for cutting the slat that is to be molded by the molding equipment 2 to a predetermined length, for forming insertion holes through which to insert ascending-descending cord, and for inserting the slats through the ladder cord; and a controller 4 for controlling operations of the slat inserting device 3.

A coil receiving member 5 of the molding equipment 2 is loaded with a slat material 6 formed of a continuously long alminum thin plate. A couple of forming rollers 7*a*, 7*b* for shaping the slat material 6 crookedly are provided at the upper portion of the molding equipment 2, such rollers being rotationally driven by a driving motor 29 provided within the molding equipement 2 which motor will be mentioned later. The slat material 6 pulled out from the coil receiving member 5 is led to the forming roller 7*a*, 7*b* with the help of a plurality of guide rollers 8, in which place the slat material 6 is so pressed as to be bent.

On one side of the slat inserting device 3, there are provided a pair of feed rollers 9*a*, 9*b* for feeding out the slat material 6 molded by the forming rollers 7*a*, 7*b* to slat inserting machines 13 that are to be touched upon later. These feed rollers 9*a*, 9*b* are driven by a step motor 30 within the slat inserting device 3 which motor will be mentioned later. The slat material 6 molded by the forming rollers 7*a*, 7*b* is led to the feed rollers 9*a*, 9*b* by a plurality of guide rollers 10. Thereafter, the slat material 6 molded by the forming rollers 7*a*, 7*b* is fed out toward the slat inserting machines 13 by means of the feed rollers 9*a*, 9*b*. In such a case, the degree to which the slat material 6 is fed out is determined by a rotational rate of the feed rollers 9*a*, 9*b*, viz., by a rotational angle of the step motor.

The slat inserting device 3 is equipped with a hole forming device 11 and a cutter 12 which are disposed on a passage for the slat material 6, the hole forming device 11 being designed for forming insertion holes in the slat material 6 through which to insert the ascending-descending cord, the cutter 12 being designed for cutting the slat material 6 to the predetermined length. The hole forming device 11 and the cutter 12 are driven by an air cylinder (not illustrated) which is actuated by compressed air sent from a pump 28 that will be hereinafter be described. The slat material 6 is fed by the predetermined length from the feed rollers 9*a*, 9*b*, at which time insertion holes are formed by the use of the hole forming device 11, and the slat material 6 is then cut by the cutter 12.

The slat inserting device 3 subsumes seven units of the inserting machines 13 which are diposed behind the hole forming device 11 and the cutter 12. These inserting machines 13 are driven by first and second air cylinders 14*a*, 14*b* that are to be mentioned later, these air cylinders being actuated by compressed air transferred from a pump 28 that will likewise be touched upon later. Each of the inserting machines 13 inserts the slat material 6 through the ladder cord 15 and at the same time sends slats 16 upwards which are cut to the predetermined length, thus inserting the slats 16 having a given number of steps through the ladder cord by repeating the above-described operations.

The controller 4 includes a multiplicity of operating switches that are provided on the front surface thereof. As shown in FIG. 2, these operating switches consist of an input key 17 for setting lengths of the slats 16, a display unit 18 for displaying input values of the input key 17, an input key 19 for setting the height of the blind, a display unit 20 for displaying input vlues of the input key 19, an input key 21 for selecting the right insertion hole or the left insertion hole for the ascending-descending cord at which the ladder cord 15 is positioned in the respective inserting machines 13, a display unit 22 for displaying input values of the input key 21, a power source switch 23 for supplying the blind fabricating apparatus 1 with electric power, a start switch 24 for starting the operations of the blind fabricating apparatus 1, and a stop switch for temporarily stopping the operations thereof.

Figure 3:
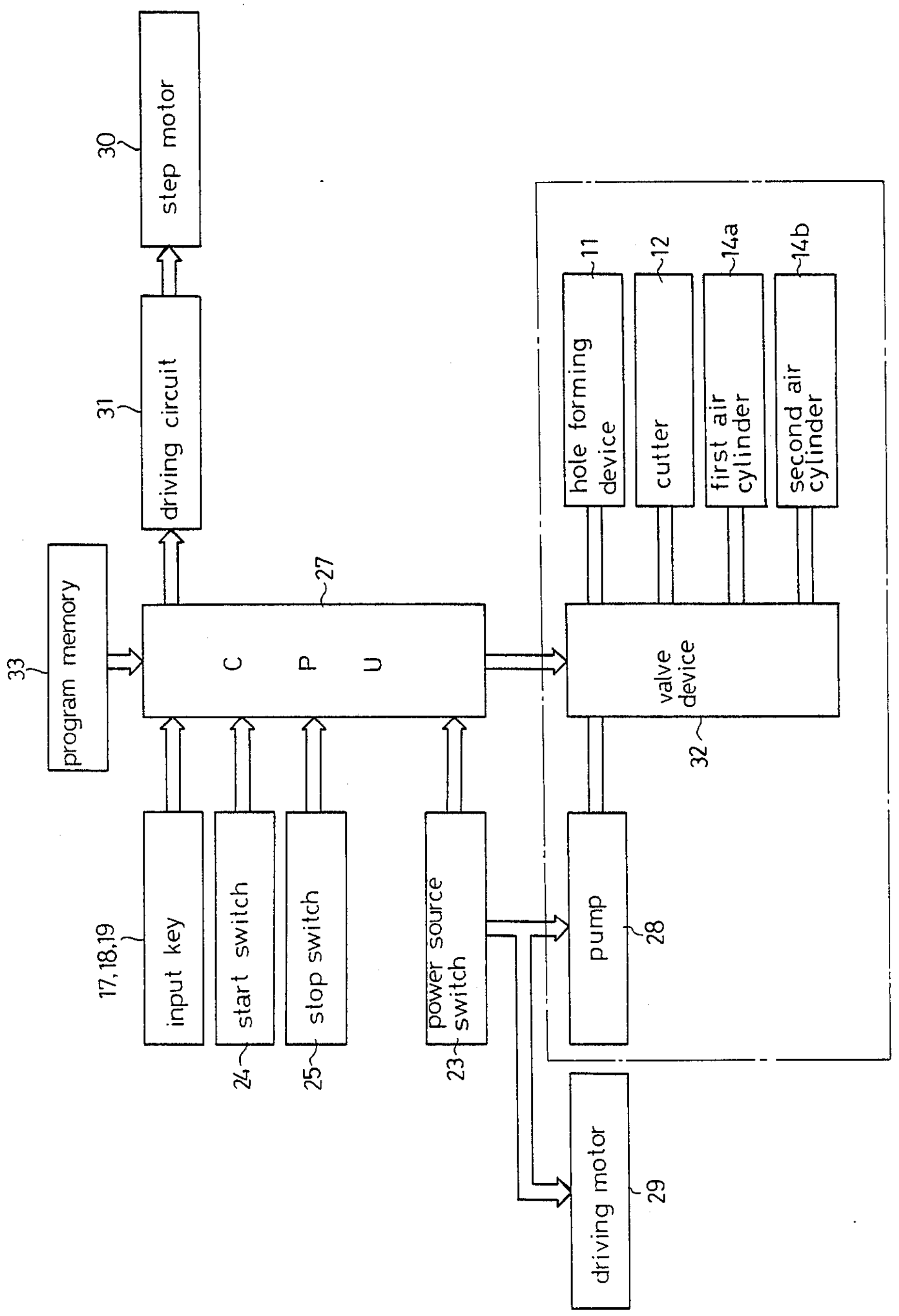
FIG. 3 is a block diagram showing an electrical constitution of the blind fabricating apparatus and a constitution of an air-pressure circuit.

In the second place, an electrical configuration of the thus constituted controller 4 will be described with reference to FIG. 3. Output signals based on the operations of the foregoing switches 23, 24, 25 and the respective input keys 17, 19, 21 are inputted to a central processing unit (hereinafter referred to as CPU) 27 provided within the controller 4. The power source switch 23 is connected to the pump 28 which supplies the compressed air to the air cylinders 14*a*, 14*b*, hole forming device 11 and the cutter 12 and to the driving motor 29 as well for driving the aforecited forming rollers 7*a*, 7*b*. Owing to the operations thereof, each of the devices is arranged to be charged with electric power.

To the CPU 27 is linked a step motor 30 for driving the feed roller 9*a*, 9*b* via a driving circuit 31; and a valve device 32 is connected to the CPU 27. This valve device 32 is disposed between the pump 28 and a group consisting of air cylinders of the hole forming device 11 and the cutter 12 and of the air cylinders 14*a*, 14*b* of the respective inserting machines 13, the arrangement being such that the valve device 32 opens and closes the air-pressure circuit to control it on the basis of the output signals transmitted from the CPU 27 which valve device 32 is placed between the pump 28 and the respective air cylinders 14*a*, 14*b*.

A program memory 33 connected to the CPU 27 involves a read only memory (ROM) in which a program for functioning the CPU 27 is stored beforehand, whereby the CPU 27 works on the basis of such a program.

Immediately after the input keys 17, 19, 21 have set each length of the slats of the blind, the height of the blind and a distributed configuration of the ladder cord with respect to the insertion holes for the ascending-descending cord, the CPU 27 computes the positions at which the insertion holes through which to insert the ascending-descending cord are formed with the respect to the length of the slat which is inputted on the basis of the preset program, and then outputs a predetermined number of pulse signals, thereby driving the step motor 30 at a given angle and shifting the slat material 6 toward the inserting machines 13. In the wake of this, the CPU 27 outputs signals to the valve device 32 to actuate the hole forming device 11. These operations are repeated, and a plurality of insertion holes are formed in the slat material 6. Thereafter, the step motor 30 is made to rotate to a predetermined degree which corresponds to the length of the slat, and the CPU 27 outputs signals to the valve device 32 with the intention of operating the cutter 12 thereby to cut the slat material 6 to the given length to form the slats 16. Upon formation of the thus cut slats 16, the CPU 27 outputs the signals to the valve device 32 to actuate the inserting machines 13, whereby the slats 16 inserted through the ladder cord 15 is moved upwards. The CPU 27 then outputs the signals to the step motor so as to move the slat material 6 again in the direction of the inserting machines 13.

The structure of the inserting machine 13 will be described at full length with the reference to FIGS. 4 to 14 inclusive. In the inserting machine 13, a couple of guide plates 35*a*, 35*b* that are fixed in front and in rear to the lower portion of a base plate 34. On right and left sides of the guide plates 35*a*, 35*b*, four pairs of guide rollers 36 are rotatably supported so that they vertically stand vis-à-vis with each other. The front and rear side portions of the base board 37 are inserted between the guide rollers 36 which are disposed upwards and downwards between the guide plates 35*a*, 35*b*. With this arrangement, the inserting machine 13 is so supported on the base board 37 as to be movable in the right and left directions shown in FIG. 1.

A movable plate 38 is bolted down into the base plate 34 by means of a bolt 39 so that the movable plate 38 disposed on the base plate 34 is rotatably retained on the base plate 34. A first supporting plate 40 is vertically fixed to one side portion of the movable plate 38, and a substantially semi-circular cam 41 is rotatably supported by a shaft 42 to the upper end of the first supporting plate 40. Similarly, a T-shaped second supporting plate 43 adjacent to the first supporting plate 40 is vertically fixed to the one side portion thereof; and the back end of a holding plate 44 is fixed to the upper rear end of the second supporting plate 43. The tip end of the holding plate 44 is formed with a crooked portion 44*a* opened upwards.

Figure 4:
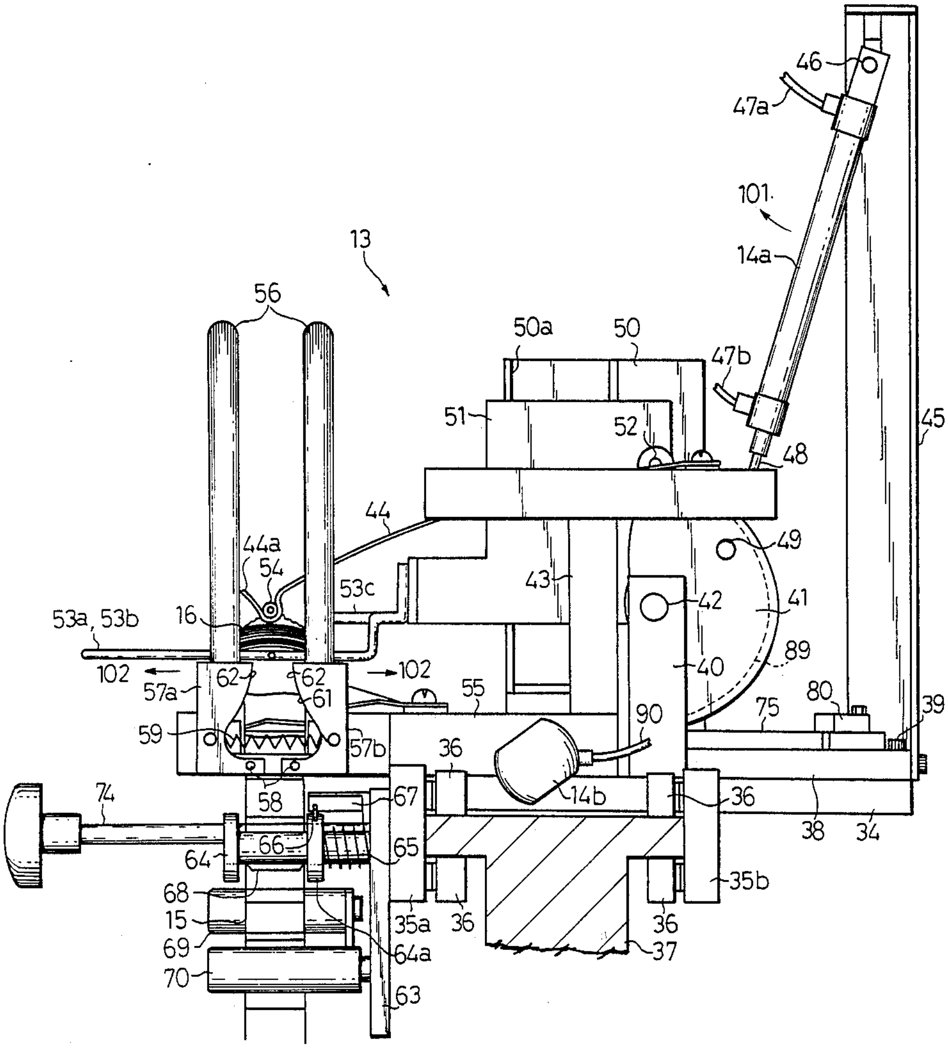
FIG. 4 is a side view of an inserting machine.

A supporting pole 45 is perpendicularly fixed to the rear end of the movable plate 38; and a first air cylinder 14*a* is supportingly suspended by a shaft 46 from the upper end of the supporting pole 45 so that the air cylinder 14*a* is movable in the direction indicated by an arrowhead 101 shown in FIG. 4. To the upper and lower portions of the first air cylinder 14*a* are respectively connected an upper air tube 47*a* and a lower air tube 47*b* which are communicated with the above-described valve device 32. The compressed air fed from the pump 28 via the valve device 32 which is so controlled as to be opened and closed by the CPU 27 is supplied through the upper air tube 47*a* or the lower air tube 47*b* into the first air cylinder 14*a*. Thereupon, a protrudent shaft 48 is arranged to appear and disappear at the lower portion of the first air cylinder 14*a*.

The lower end of the protrudent shaft 48 is rotatably joined to the cam 41 by the use of a shaft 49. By virtue of the appearance and disappearance of the protrudent shaft 48, the cam 41 is allowed to rotate within a range from a position depicted in FIG. 5 to a position drawn by a chain line of FIG. 6.

Figure 5:
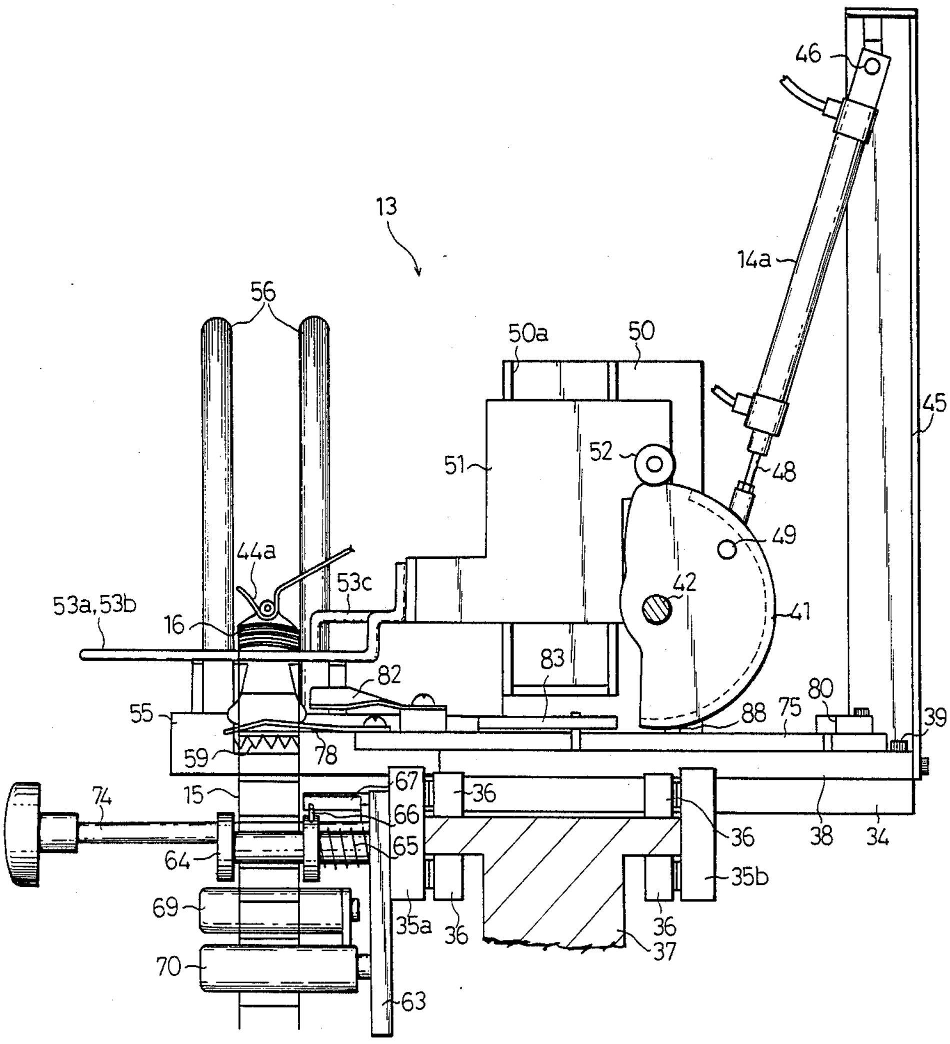
FIGS. 5, 6 are side views each showing an action of a cam of the inserting machine.
Figure 6:
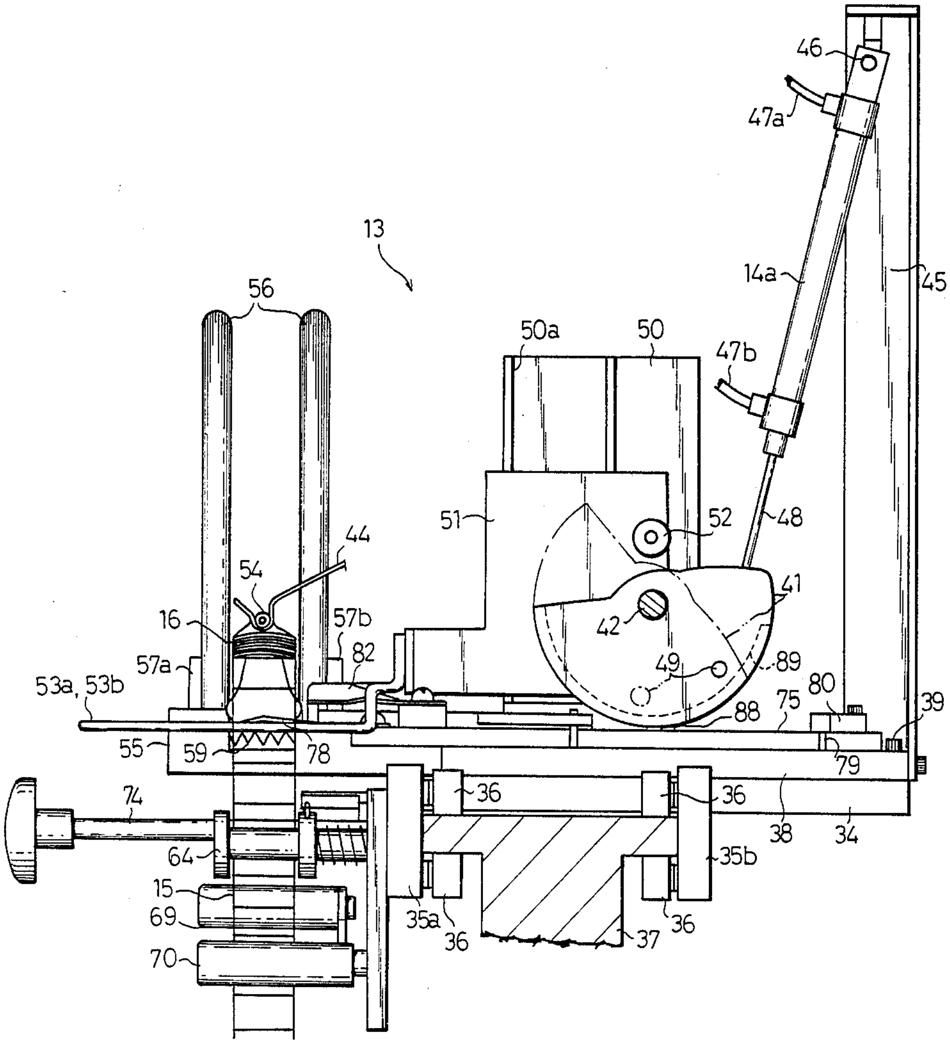

A guide pole 50 is perpendicularly fixed to the other side portion of the movable plate 38, and a moving member 51 is fluctuably supported along a guide rail 50*a* provided on the guide pole 50. The moving member 51 is linked to the movable plate 38 by means of a coil spring (not illustrated); and the moving member 51 is constantly biased toward the movable plate 38, viz., in the lower direction thereof by dint of a spring force of the coil spring. A cam roller 52 is rotatably supported to the side surface of the moving member 51 which surface is directed to the cam 41. As shown in FIG. 5, in a state wherein the protrudent shaft 48 enters almost completely the air cylinder 14*a*, the cam roller 52 is pushed up by the cam 41, whereby the moving member 51 is stayed at the highest position. In such a state, the protrudent shaft 48 is made to project from the first air cylinder 14*a*, and the cam roller 52 is, as illustrated in FIG. 6, rendered movable downwards along the cam 41. As a result, the moving member 51 is arranged to descend to the lowest position shown in FIG. 6 by dint of the spring force of the coil spring and the weight of its own.

Figure 7:
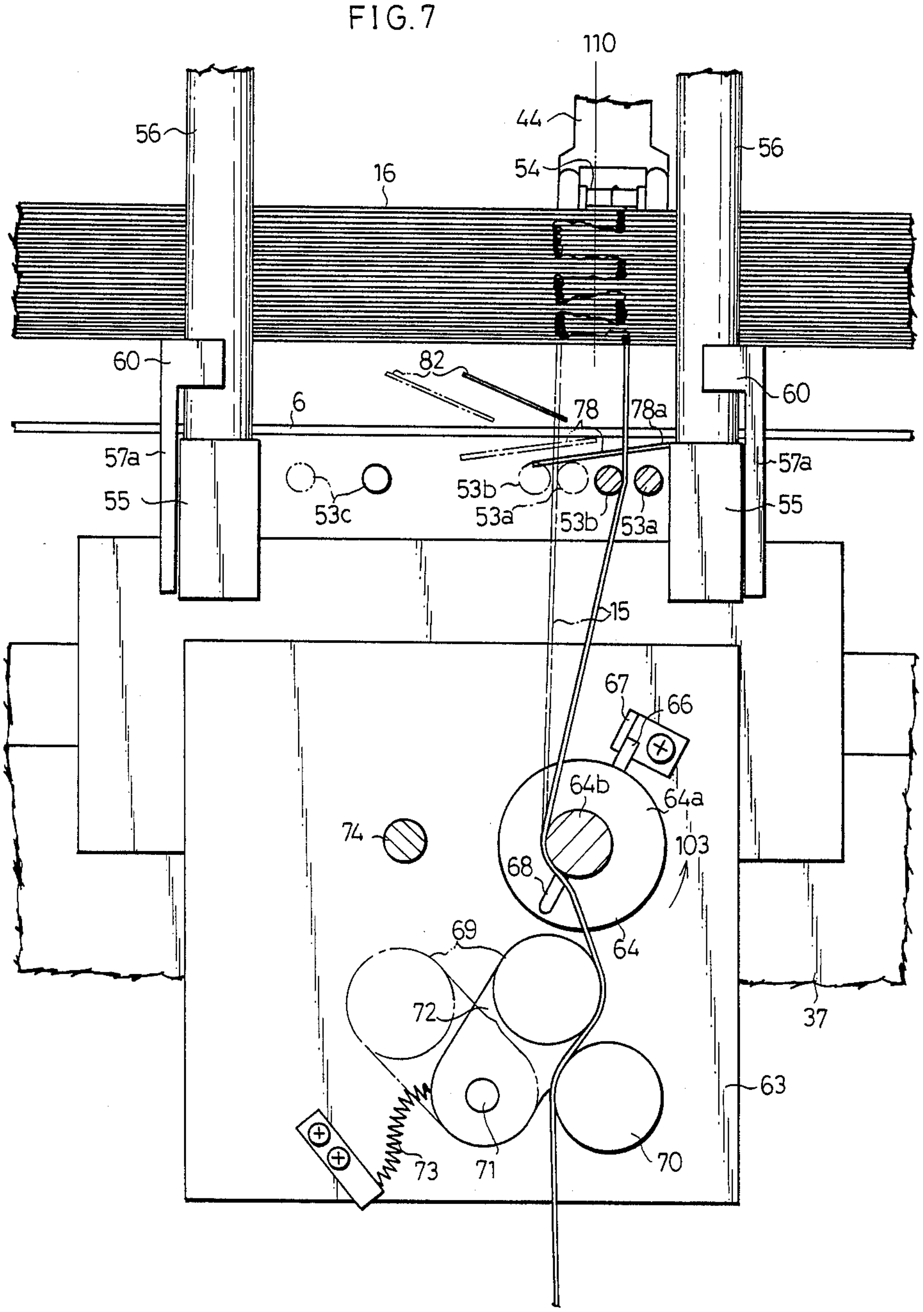
FIGS. 7, 8 are elevational views each showing behavior of slat insertion by the inserting machine.

The proximal ends of three lifting bars 53*a*, 53*b*, 53*c* which are projected in the horizontal direction are fixed to the lower portion of the front end of the moving member 51. The lifting bars 53*a*, 53*b* are, as shown in FIG. 7, rendered protrudent at the lower portion of the holding plate 44, while the lifting bar 53*c* is projected at the left portion thereof. The ladder cord 15 which is supportingly suspended from a suspension bar 54 retained by the crooked portion 44*a* of the holding plate 44 is inserted between the right and left lifting bars 53*a*, 53*b*.

As shown in FIGS. 4, 7, a couple of supporting members 55 are fixed to the right and left portions of the base plate 34 so that they jut out in the forward thereof. Guide shafts 56 jut out upwards from the tip ends of the supporting members 55, such guide shafts being disposed by twos in front and in rear. A spacing between the guide shafts disposed in front and in rear is, as shown in FIG. 4, formed so that the slat 16 is allowed to be inserted therein and to be so supported as to be unmovable back and forth. In this case, a width of the slat is 15 mm.

Outside the respective guide shafts 56, a pair of stoppers 57*a*, 57*b* are movably supported by a shaft 58. These stoppers 57*a*, 57*b* are linked to each other by means of a coil spring 59 at a higher position than the shaft 58 so that they are made to approach each other by dint of the spring force thereof. However, inasmuch as the stoppers 57*a*, 57*b* are, as shown in FIG. 7, provided with rotation regulating members 60 engaging with the respective guide shafts 56, these stoppers come to positions shown in FIG. 4. The lower portions of the side surfaces with which the stoppers 57*a*, 57*b* stand vis-à-vis are symmetrically scooped out, thereby forming slat inserting portions 61, respectively. Hypotenuses 62 are formed so that the stoppers 57*a*, 57*b* gradually approach each other from the slat inserting portions 61 to the upper part; and in such a state that the lifting bars 53*a*, 53*b*, 53*c* are at the positions depicted in FIG. 6, the slat material 6 is inserted into the inserting machine 13 with the aid of the feed rollers 9*a*, 9*b*, whereby the slat material 6 is put into the slat inerting portions 61. In such a state, the slats 16 are lifted by the lifting bars 53*a*, 53*b*, 53*c*, the stoppers 57*a*, 57*b* are expanded externally, viz., in the direction indicated by an arrowhead 102 of FIG. 4 while resisting the spring force of the coil spring 59, such expansion being caused by the insertion of the slats 16. As a result, the slats 16 are lifted up to a position higher than the stoppers 57*a*, 57*b*, at which time the stoppers 57*a*, 57*b* return to the original positions illustrated in FIG. 4. Even if the lifting bars 53*a*, 53*b*, 53*c* are lowered in such a state, the slats 16 are supported on the stoppers 57*a*, 57*b*.

As shown in FIG. 4, an installation plate 63 is fixed to the front surface of the guide plate 35*a* disposed forwards. A tension pulley 64 for properly tensing the foregoing ladder cord 15 is supportingly secured to the front surface of the installation plate 63, this tension pulley 64 being rotatable with respect to the installation plate 63. A torsion coil spring 65 is provided at the proximal end of the tension pulley 64; and one end of the coil spring 65 is fixed to the installation plate 63 and the other end thereof is fixed to the tension pulley 64 which is invariably biased in the direction pointed by an arrowhead 103 of FIG. 7.

A stoppage shaft 66 is protruded from one side of the outer periphery of the a rear side plate 64*a* of the tension pulley 64. A stoppage member 67 engaging with the stoppage shaft 66 so that the stoppage member 67 is situated on the rotational locus thereof, the proximal end of which is fixed to the installation plate 63. The tension pulley 64 biased by the torsion coil spring 65 is always hindered from rotating at the position shown in FIG. 7.

Figure 9:
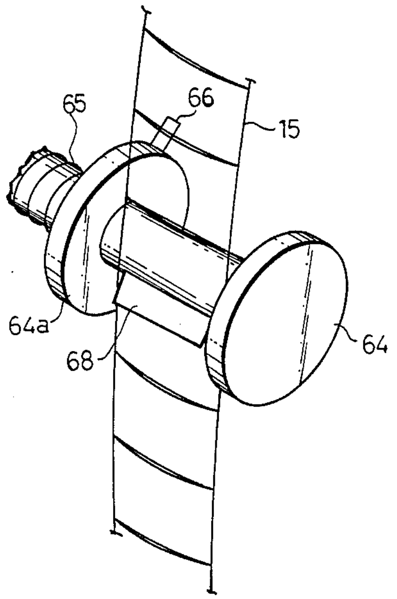
FIG. 9 is a perspective view showing the ladder cord which is interlocked with a tension pulley.

A protrudent member 68 which is provided on a shaft portion 64*b* of the tension pulley 64 juts out in the direction opposite to the above-described stoppage shaft 66 with respect to the axial core of the tension pulley 64. A lateral string of the ladder cord 15, as shown in FIG. 9, is put over the protrudent member 68; and the ladder cord 15 is so pulled down as to create a proper tension when the stoppage shaft 66, as illustrated in FIG. 7, engages with the stoppage member 67.

At the lower portion of the tension pulley 64 are provided a movable roller 69 and a fixed roller 70 with the intention of guiding the ladder cord 15 from the lower portion toward the tension pulley 64 while making the ladder cord 15 securely engage with the tension pulley 64. The movable roller 69 is fixed to the tip end of an arm 72 which rotates round a shaft 71 defined as the rotational supporting point thereof. By dint of the spring force of a coil spring 73 whose supporting point is the installation plate 63, the arm 72 is, as shown in FIG. 7, made to rotate to a position where the arm 72 invariably impinges upon the fixed roller 70. On the occasion of actuating the blind fabricating apparatus 1, if the movable roller 69 is so made to rotate to the position indicated by a chain line of FIG. 7 as to resist the spring force of the coil spring 73, the ladder cord 15 is arranged to be readily inserted between the tension pulley 64 and the respective rollers 69, 70.

At the side portion of the tension pulley 64 is provided an installation bar 74, the tip end of which is screwed into a screw hole penetrating both the installation plate 63 and the guide plate 35*a*. If the tip end of the installation bar 74 is screwed down to such an extent that it presses the base board 37, the inserting machine 13 is so fixed to the base board 37 as to be unmovable. Hence, when this installation bar 74 is manipulated, the inserting machine 13 is moved to a desired position on the base board 37 and can be fixed thereto.

Figure 10:
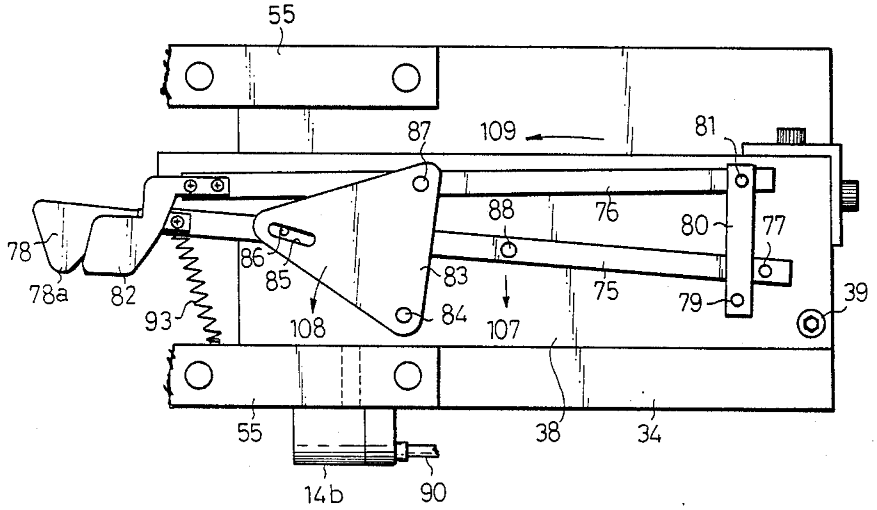
FIGS. 10, 11 are plan views showing behavior of first and second operating rods.

Two operating rods 75, 76 are disposed on the movable plate 38. The first operating rod 75 is, as shown in FIG. 10, rotatably supported on the movable plate 38, in which case a shaft 77 provided at the proximal end serves as the supporting point thereof. The tip end of the first operating rod 75 is equipped with a first guide member 78 for guiding the slat material 6 to every space between the lateral strings of the ladder cord 15. The guide member 78 is formed of a matallic thin plate having a pointed end portion 78*a* in the direction of the ladder cord 15 and assumes, as shown in FIG. 7, such a configuration that the inclined surface thereof becomes high according as it approaches the pointed end portion 78*a*.

The proximal end of a connecting rod 80 is so supported by a shaft 79 as to be rotatable with respect to the movable plate 38 at the upper part of the first operating rod 75 in the vicinity of the proximal end of the first operating rod 75; and the tip end of the connecting rod 80 is rotatably linked to the proximal end of a second operating rod 76 by means of a shaft 81. A second guide member 82 which is likewise formed of a metallic thin plate is secured to the tip end of the second operating rod 76 and has an inclined surface which, as shown in FIG. 7, decreases in height as it goes toward the ladder cord 15.

A connecting plate 83 situated at the upper part of the intermediate portion between the first and second operating rods 75, 76 is formed in a substantially triangular shape. On the right side (on the lower side in FIG. 10) of the first operating rod 75, a top portion thereof is so supported by a shaft 84 as to be rotatable with respect to the movable plate 38; a second top portion thereof is formed with a slit 85 through which to movably insert a shaft 86 protrudent from the first operating rod 75; and a third top portion thereof is rotatably supported by a shaft 87 at the intermediate portion of the second operating rod 76.

Figure 12:
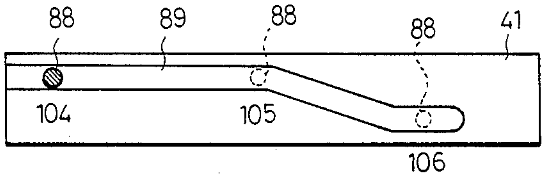
FIG. 12 is a development elevation showing a guide groove formed in the cam.

At the intermediate portion of the first operating rod 75, a cam shaft 88 juts out upwards, the tip end of which is, as shown in FIG. 4, projected into a guide groove 89 formed in the outer periphery of the cam 41. As shown in FIG. 12, in a state wherein the outer peripheral surface of the cam 41 is developed, this guide groove 89 subsumes an oblique portion extending from one side of the cam 41 to the other side thereof within a half of the overall length, viz., a portion ranging from its middle part to one end. When the cam 41 is placed at the position shown in FIG. 5, the cam shaft 88 is situated at a position 104, indicated by a solid line of FIG. 12, of the guide groove 89. If the cam 41 is made to rotate to the position shown in FIG. 6, the cam shaft 88 makes a relative movement to a position 105 of FIG. 12. When the cam 41 is further made to rotate to the position indicated by a chain line of FIG. 6, the cam shaft 88 is arranged to makes a relative movement to a position 106 of FIG. 12. Consequently, the cam 41 is rotated from the position indicated by the solid line of FIG. 6 to the position depicted by the chain line thereof, at which time the cam shaft 88 moves in the direction indicated by an arrowhead 107 of FIG. 10. With this step, the first operating rod 75 rotates round the shaft 77 defined as its rotational supporting point in the same direction as that pointed by the arrowhead 107.

Upon rotation of the first operating rod 75 in the direction pointed by the arrowhead 107 of FIG. 10, the shaft 86 is concomitantly rotated in the same direction and hence the connecting plate 83 is made to rotate round the shaft 84 serving as its rotational supporting point in the direction indicated by an arrowhead 108. Thereupon, a shaft 87 likewise rotates in the same direction, so that the second operating rod 76 is arranged to move forward, viz., in the direction indicated by an arrowhead 109 while making the connecting rod 80 rotate.

Figure 11:
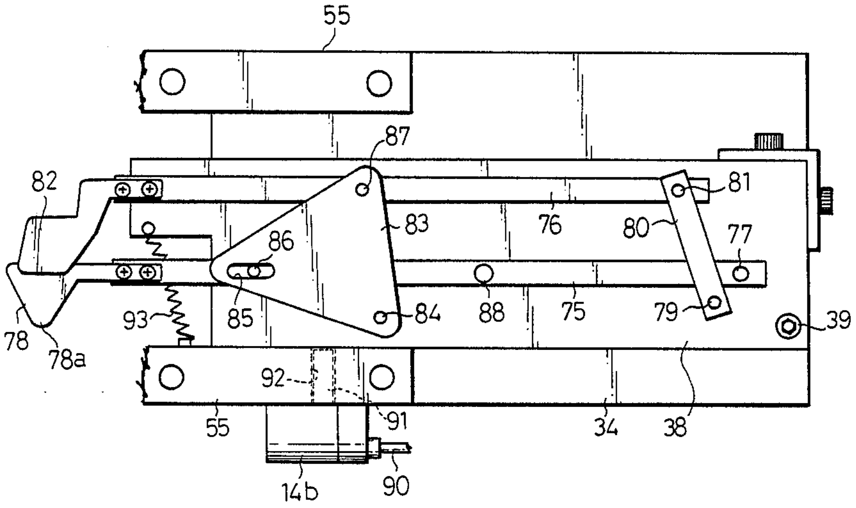
Figure 14:
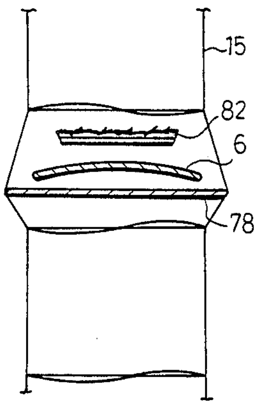
FIG. 14 is an elevational view of the ladder cord, showing a situation when a first guide piece develops the ladder cord.

Accordingly, when the cam 41 is made to rotate from the position shown by the solid line of FIG. 6 to the position indicated by the chain line, the first and second operating rods 75, 76 move from the positions shown in FIG. 10 to the positions shown in FIG. 11. Under a condition where the two operating rods 75, 76 are thus shifted, as shown in FIGS. 7, 14, the first and second guide members 78, 82 are respectively situated at the upper and lower portions of the insertion passage for the slat material 6, and a pointed end portion 78*a* of the first guide member 78 is rendered protrudent between the logitudinal strings within the ladder cord 15 to expand these longitudinal strings outwards, respectively.

Figure 13:
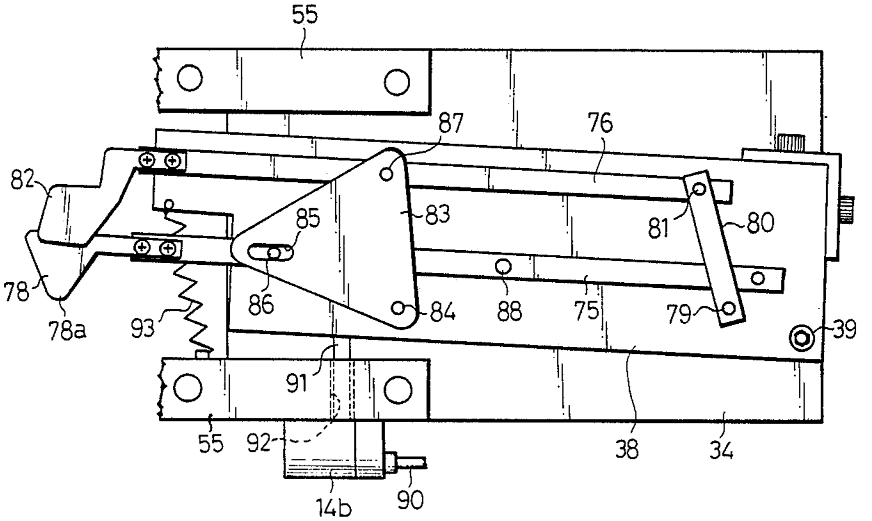
FIG. 13 is a plan view showing a situation when a movable plate rotates.

The second air cylinder **14*b* is fixed to a supporting member 55 provided at the right hand of the inserting machine 13. An air tube 90 communicated with the above-described valve device 32 is connected to the air cylinder 14*b*, a protrudent shaft 91 of which is always positioned in an insertion hole 92 formed in the supporting member 55. When the compressed air is fed from the pump 28 via the valve device 32 into the second air cylinder 14*b*, the protrudent shaft 91, as shown in FIG. 13, presses the movable plate 38, thereby revolving movable plate 38 round the bolt 39** defined as the supporting point thereof.

As shown in FIG. 10, the tip end of the movable plate 38 is linked to the supporting member 55 disposed on the side of the second air cylinder **14*b* through the instrumentality of a coil spring 93; and the movable plate 38 is invariably biased to the supporting member 55. Where the protrudent shaft 91 is retracted from the position shown in FIG. 13 into the insertion hole 92, the movable plate 38 is made to rotate by dint of the spring force of the coil spring 93 and returns to the position illustrated in FIG. 10**.

On the occasion when the movable plate 38 is thus shifted, each of the foregoing members secured to the movable plate 38 moves integrally with the movable plate 38. The lifting bars **53*a*, 53*b*, 53*c* and the first and second guide members 78, 82 are situated at the positions indicated by the solid lines of FIG. 7 when the protrudent shaft 91 of the second air cylinder 14*b* is in the insertion hole 92. This protrudent shaft 91 is projected from the insertion hole 92 and then comes to the position indicated by the chain line of FIG. 7. Namely, the ladder cord 15 which is inserted between the lifting bars 53*a*, 53*b* is moved from the position depicted by the solid line of FIG. 7 to the position depicted by the chain line thereof by virtue of the movement of the movable plate 38. Between the above-described two positions, the insertion holes for the ascending-descending cord is placed at a position 110 of the slats 16. The ladder cords 15** are therefore distributed into the two sides of the insertion holes for the ascending-descending cord.

Figure 15:
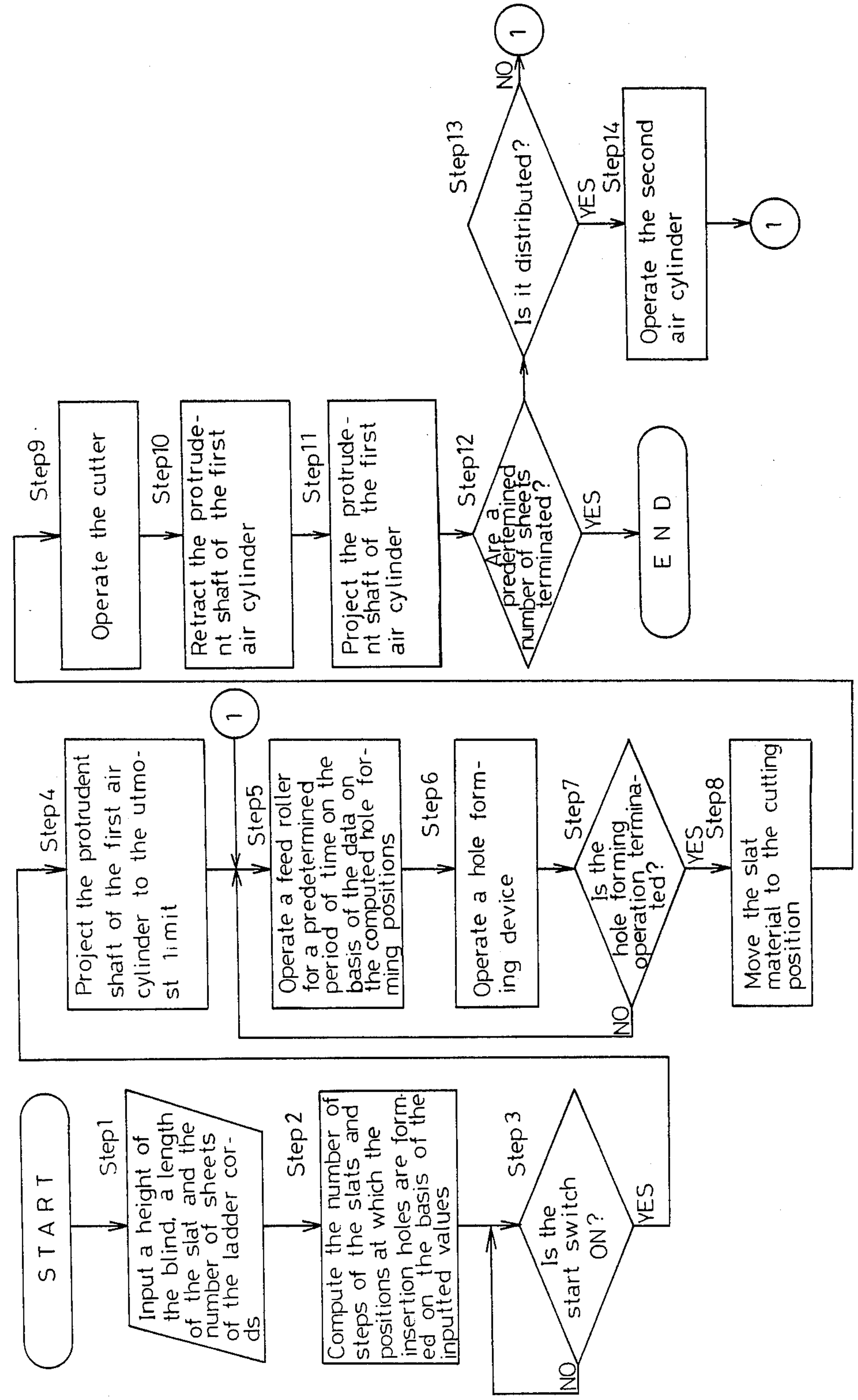
FIG. 15 is a flow chart showing functions of a CPU.

The functions of the thus constituted blind fabricating apparatus 1 will hereinafter be described in accordance with the flow chart of FIG. 15.

The blind fabricating apparatus 1, prior to the starting, is required to set the height of the blind, the length of the slat 16 and the way to distribute the ladder cords 15 on the basis of the insertion holes formed in the respective slats 16 for the ascending-descending cord and to input these data. After operating the power source switch 23, the aforementioned data are inputted by means of the input keys 17, 19, 21 of the controller 4 (step 1). The CPU 27 then computes the number of steps of the slats 16 of the blind that is to be fabricated on the basis of a width 15 mm of each of the slats 16 to be fabricated by the blind fabricating apparatus 1 and a value of the height of the blind, and further computes the positions at which to form the insertion holes for the ascending-descending cord on the basis of the inputted length of the slat in accordance with the program previously stored in the program memory 33 (step 2).

Figure 1:
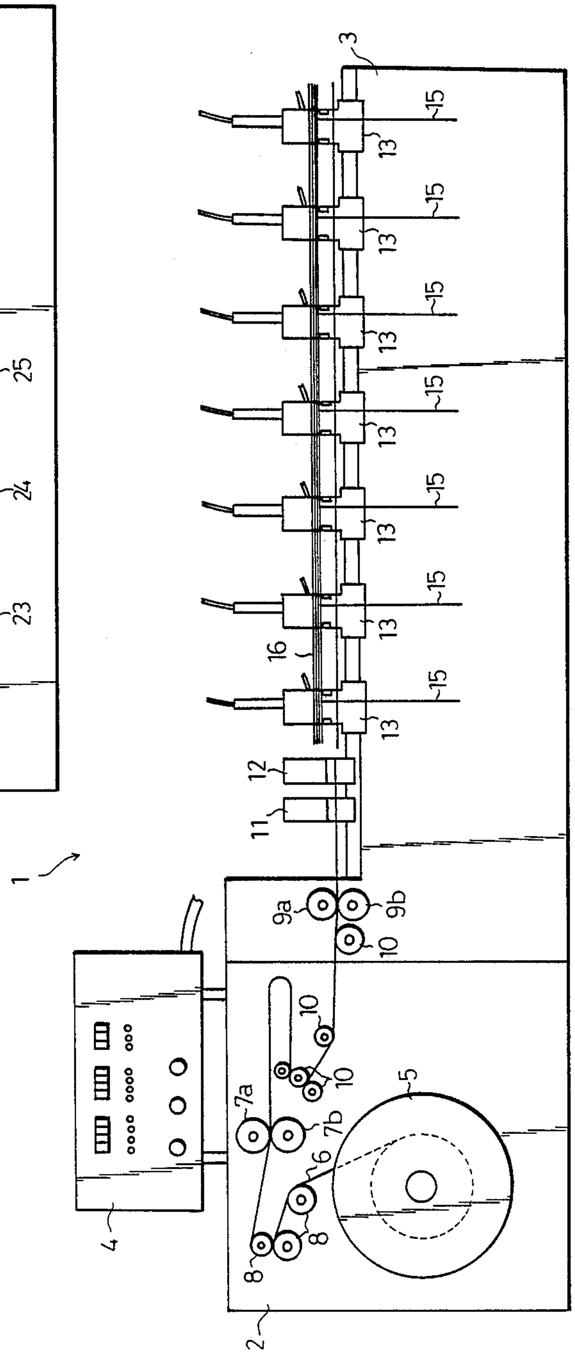
FIG. 1 is an elevational view showing one embodiment of an apparatus for fabricating a blind according to the present invention.

For instance, as shown in FIG. 1, if the length of each of the slats of the blind to be fabricated is so set as to be in proportion to seven pieces of ladder cords 15, the operator places each of the inserting machines 13 on the base board 37, moves them to the positions corresponding to the respective ladder cords 15 and then fastens them by means of installation bars 74. The suspension bar 54 seizing the upper end of the ladder cord 15 is retained by the crooked portion **44*a* formed at the tip end of the holding plate 44 in order that the ladder cord 15 is supportingly suspended from the holding plate 44. The ladder cord 15 is, as shown in FIG. 7, inserted between the lifting bars 53*a*, 53*b* and is at the same time hung on the tension pulley 64, movable roller 69 and the fixed roller 70, at which time the movable roller 69 rotates to the position depicted by the chain line of FIG. 8 and the tension pulley 64 is, as shown in the Figure, made to rotate while resisting the spring force of the torsion coil spring 65. In such a state, the ladder cord 15 is put over the tension pulley 64 and the fixed roller 70, and when the movable roller 69 is returned to the original position indicated by the solid line of FIG. 8, the protrudent member 68 of the tension pulley 64 engages with the lateral string of the ladder cord 15 so as to pull down the ladder cord 15, whereby the ladder cord 15 is tensed between the tension pulley 64 and the suspension bar 54** without any slack.

After the respective inserting machines 13 and the ladder cords 15 have been set, when the operator pushes the start switch 24 (step 3), the CPU 27 inputs a signal to the valve device 32 to actuate the first air cylinder **14*a* of each of the inserting machines 13 for the purpose of projecting the protrudent shaft 48 to the utmost limit (step 4). Immediately, the cam 41 is rotated to the position indicated by the chain line of FIG. 6, in which state the moving member 51, as shown in FIG. 6, descends and the lifting bars 53*a*, 53*b*, 53*c* are, as shown in FIGS. 6, 7, positioned lower than the slat inserting portions 61 for the stoppers 57*a*, 57*b*. When the cam 41 is rotated as described above, the cam shaft 88 of the first operating rod 75 that stays at the position depicted in FIG. 10 moves in the direction pointed by the arrowhead 107 of FIG. 10 with the help of the guide groove 89 formed in the cam 41 and hence the first operating rod 75 is made to rotate round the shaft 77 serving as the supporting point thereof in the same direction as that indicated by the arrowhead 107. When the first operating rod 75 is thus rotated, the second operating rod 76 is shifted by the connecting plate 83 in the direction indicated by the arrowhead 109 of FIG. 10, as a result the two operating rods 75, 76 move to the positions shown in FIG. 11**.

The first and second guide members 78, 82 provided at the tip ends of the thus moved operating rods 75, 76 come to the positions shown by the solid lines of FIG. 7. Namely, the pointed end portion **78*a* of the first guide member 78 enters between the longitudinal strings of the ladder cord 15 so that the first guide member 78, as shown in FIG. 14, expands the longitudinal strings of the ladder cord 15 outwards at a position that is slightly lower than the intermediate portion between the upper and lower lateral strings thereof; and the second guide member 82, as shown in FIG. 7, stays at the left hand of the first guide member 78, viz., at an obliquely upper position in front of the insertion passage for the slat material 6**.

As described above, where the protrudent shaft 48 of the first air cylinder **14*a* of each of the inserting machines 13 is projected to the utmost limit, the CPU 27 outputs a signal to the driving circuit 31 of the step motor 30 with a view to actuating the step motor 30 at a given angle. The feed rollers 9*a*, 9*b* concomitantly rotate to transfer the slat material 6** which is already crooked by the forming rollers 7*a*, 7*b* toward the hole forming device (step 5). The step motor 30 is operated at the predetermined angle on the basis of the hole forming positions which are computed beforehand by the CPU 27. In the wake of this, the CPU 27 outputs a signal to the valve device 32 to actuate the hole forming device 11, thereby forming the insertion hole through which to insert the ascending-descending cord (step 6).

The CPU 27 which arranges for the hole forming device 11 to form one insertion hole then judges as to whether additional holes need to be formed in the slat material 6 or not (step 7). As shown in FIG. 1, in order to form a series of the slats 16 each length of which is balanced with seven pieces of the ladder cords 15, given that totally four positions at which the insertion holes for the ascending-descending cords are formed at alternate positions of the ladder cords 15 are computed in advance by the CPU 27, the CPU 27 judges that it is necessary to further form the holes and performs a function to operate the step motor 30 at the predetermined angle on the basis of the data relative to the hole forming positions that are previously computed (step 5). After this step, the CPU 27 actuates the hole forming device 11 to form the insertion holes (step 6), whereby four insertion holes are formed in the slat material 6 at predetermined intervals by repeating the above-mentioned steps.

In the course of such hole forming operations, the slat material 6 which is consecutively transferred to the inserting machines 13 with the aid of the feed rollers 9*a*, 9*b* is inserted through from the leftmost inserting machine 13 shown in FIG. 1 via seven machines to the rightmost one in due order. Thereafter, as shown in FIG. 7, the slat material 6 sent out from the previous inserting machine 13 is led through the slat inserting portion 61 of the left stopper 57*a* to the guide members 78, 82, and is then inserted between the longitudinal strings of the ladder cord 15 expanded by the first guide member 78. The thus inserted slat material 6 is led via the slat inserting portion 61 of the right stopper 57*a* to the next inserting machine 13.

When a sheet of slat is thus formed with a predetermined number of insertion holes, viz., four insertion holes, the CPU 27 ascertains this operation (step 7) and actuates the step motor 30 at the given angle on the basis of the preset length of the slat to feed further out the slat material 6 (step 8). Thereafter, the CPU 27 outputs a signal to the valve device 32 in order to operate the cutter 12 whereby the slat material 6 is cut to the predetermined length to form the slats 16 (step 9). In such a state, as shown in FIG. 1, the slats 16 are respectively inserted through the ladder cords 15 in all the inserting machines 13; and the aforecited insertion holes, as shown in FIG. 7, reach the position 110 slightly on the left side of the lifting bar 53*b* in each of the inserting machines 13.

Figure 8:
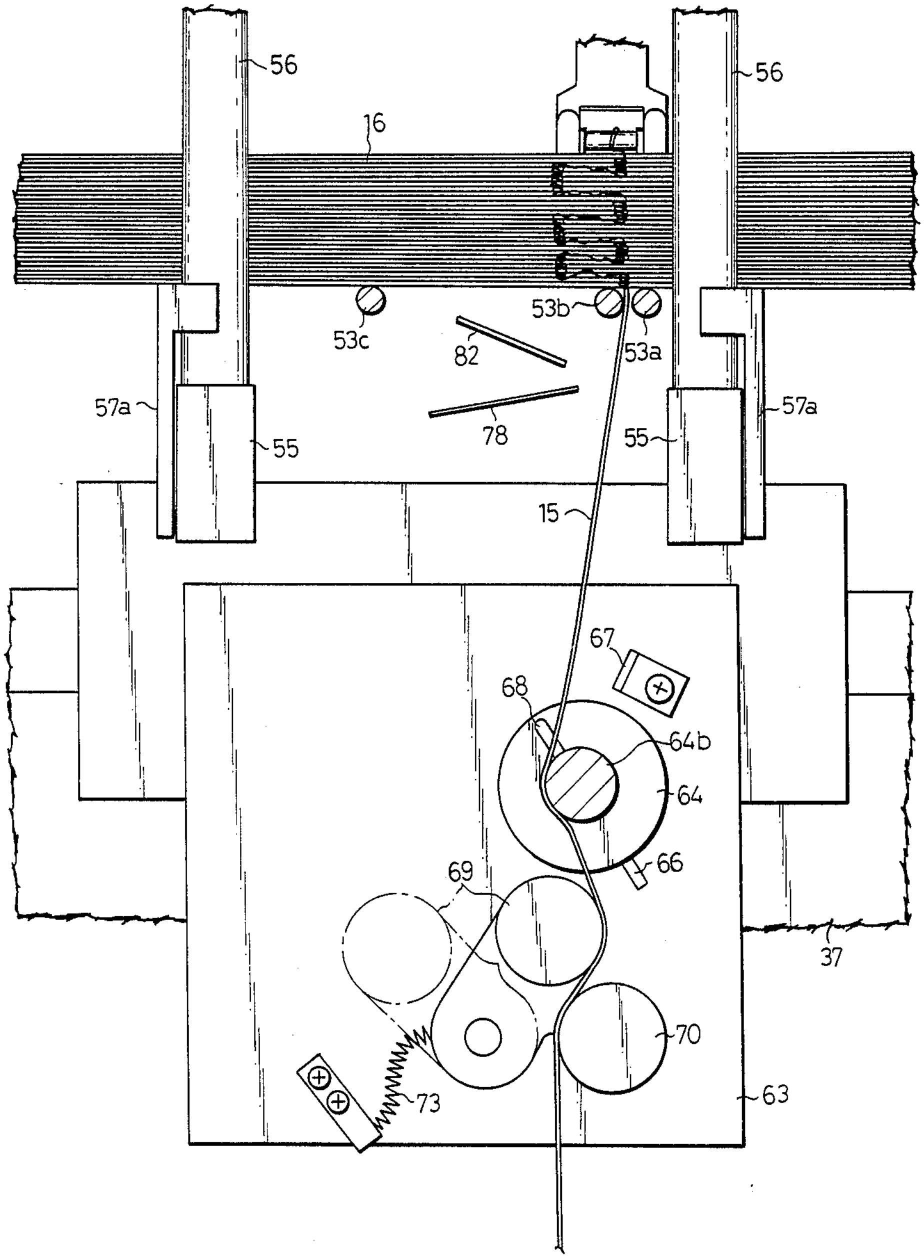

After the slats 16 have thus been cut, the CPU 27 outputs a signal to the valve device 32 to actuate the first air cylinder 14*a*, thereby retracting the protrudent shaft 48 into the same cylinder 14*a* (step 10). When the cam 41 is rotated from the position depicted by the chain line of FIG. 6 to the position depicted by the solid line thereof, the cam shaft 88 of the first operating rod 75 makes a relative movement from a position 106 of FIG. 12 to a position 105 in the guide groove 89 formed in the cam 41 and hence the first and second operating rods 75, 76 which are at the positions shown in FIG. 11 return to the positions shown in FIG. 10. Therefore, the first and second guide members 78, 82, as shown in FIG. 8, shift to the intermediate portion between the lifting bars 53*a*, 53*b* and the lifting bar 53*c*, in which state the lifting bars 53*a*, 53*b*, 53*c* are able to move upwards without impinging upon the two guide members 78, 82.

When the cam 41 is rotated from the above-described position to the position shown in FIG. 5, a cam roller 52 is raised to the position depicted in FIG. 5 by means of the cam 41, and concomitantly the moving member 51 is moved upwards. The lifting bars 53*a*, 53*b*, 53*c* are raised together with the moving member 51. At this time, the slats 16 are lifted to a position higher than the stoppers 57*a*, 57*b* by the lifting bars 53*a*, 53*b*, 53*c*. In time of the slats 16 moving from the slat inserting portion 61 to the upside, the stoppers 57*a*, 57*b* are respectively made to rotate externally by the slats 16 as they resist the spring force of the coil spring 59, thereby raising the slats 16 higher than the stoppers 57*a*, 57*b*. Then, the stoppers 57*a*, 57*b* return to the original positions shown in FIG. 4 by dint of the spring force of the coil spring 59.

When the lifting bars 53*a*, 53*b*, 53*c* are raised and the slats concomitantly ascend, the ladder cords 15 is similarly raised by the slats 16. As a result, the tension pulley 64 is, as shown in FIG. 8, rotated while resisting the spring force of the torsion coil spring 65; and eventually the lateral string of the ladder cords 15 comes off from the protrudent member 68. Immediately, the tension pulley 64 rotationally returns to the position depicted in FIG. 7, in which state the protrudent member 68 engages with the lateral string disposed one step low to tense the ladder cords 15 again. Hence, the slat material 6 inserted through the slat inserting portion 61 is cut off, and the thus cut off slats are raised to the topside of the stoppers 57*a*, 57*b*. Almost concurrently, the ladder cords 15 is also moved one step high and is then tensed by the tension pulley 64 again in such a state.

Where the lifting bars 53*a*, 53*b*, 53*c* are thus raised and the slats 16 are likewise lifted by the stoppers 57*a*, 57*b*, the CPU 27 outputs a signal to the valve device 32, and the protrudent shaft 48 of the first air cylinder 14*a* is again made to jut out (step 11). After this step, the cam 41 is rotated to the position indicated by the chain line of FIG. 6, and the lifting bars 53*a*, 53*b*, 53*c* and the guide members 78, 82 are made to stay at the positions depicted by the solid lines of FIG. 7.

Under such circumstances, the CPU 27 judges as to whether the slats 16 which are determined in number of sheets in accordance with the previously inputted height of the blind are inserted through the ladder cords 15 or not. If the CPU 27 confirms that the predetermined number of slats 16 are not yet inserted therethrough (step 12). Then, the CPU 27 judges as to whether the movable plate 38 is to be moved or not on the basis of the preset configuration of distribution of the ladder cords 15(step 13). Supposing that the slats 16 are predeterminately distributed by 20 sheets into the right and left sides of the insertion holes, the CPU 27 decides that the movable plate 38 is not made to move. Thereafter, the slats 16 are inserted through the ladder cords 15 by repeating the above-mentioned operations (steps 5 to 13 inclusive). The slats 16 which are thus inserted through the ladder cords 15 by such operations are, as shown in FIG. 7, successively laminated on the stoppers 57*a*, 57*b*.

In this wise, after 20 sheets of the slats 16 have been laminated on the stoppers 57*a*, 57*b*, the CPU 27 judges that the ladder cords 15 need to be distributed with respect to the insertion holes (step 13); and the CPU 27 outputs a signal to the valve device 32 to actuate the second air cylinder 14*b* (step 14). With this step, the protrudent shaft 91 is made to jut out. Thereupon, the movable plate 38, as shown in FIG. 13, revolves round the bolt 39 which is defined as the supporting point thereof and hence the respective members provided on the movable plate 38 are moved together with the same plate 38. Resultingly, the guide members 78, 82, the lifting bars 53*a*, 53*b*, 53*c*, and the ladder cords 15 are all, as indicated by the chain lines of FIG. 7, moved. In a state wherein the movable plate 38 is thus shifted, the CPU 27 repeates the aforementioned operations (steps 5 to 13 inclusive) and arranges for the slats 16 to be laminated on the stoppers 57*a*, 57*b* in due order. At this time, 20 sheets of the slats 16 are moved onto the stoppers 57*a*, 57*b*, and the CPU 27 again outputs a signal to the valve device 32 (steps 13, 14) so as to retract the protrudent shaft 91 of the second air cylinder 14*b* into the supporting member 55, whereby the movable plate 38 is made to return to the position shown in FIG. 11. Thereafter, the slats 16 are consecutively inserted through the ladder cords 15 by repeating the aforementioned operations (steps 5 to 12 inclusive) thereby to laminate the slats 16 on the stoppers 57*a*, 57*b*. It is to be noted that there is no necessity to distribute the ladder cords 15 as for the inserting machines 13, corresponding to the positions where no insertion hole is formed, so that any signal is not transmitted from the CPU 27.

When the slats 16 having a predetermined number of sheets computed on the basis of the preset height of the blind are inserted through the ladder cords 15, the CPU 27 ascertains that this process has been carried out (step 12) and then cease to output signals to the driving circuit 31 of the step motor 30, the driving motor of the forming rollers 7*a*, 7*b* and the valve device 32 to halt the operations of the molding device 2 and the slat inserting device 3 as well, thus terminating the slat inserting operations.

As described above, the ascending-descending cord is inserted into the insertion holes formed in the slats 16 having a multiplicity of steps which are inserted through the ladder cords 15; and the lower ends of the ascending-descending cord and the ladder cords 15 are connected to a bottom rail, while at the same time the upper ends thereof are connected to an agle adjuster and a slat lifting device provided within a head box, thereby oompleting the fabrication of a blind.

As can be clarified from the description so far made, the blind fabricating apparatus 1 is characterized such that, once a height of the blind that is to be fabricated and a length of the slat are inputted with the help of the input keys 17, 19 of the controller 4, the CPU 27 provided within the controller 4 automatically computes both the number of steps of the slats 16 and positions at which the insertion holes for the ascending-descending cord are formed. The CPU 27 actuates the forming rollers 7*a*, 7*b*, the feed rollers 9*a*, 9*b*, the hole forming device 11, the cutter 12 and the inserting machines 13 through the intermediary of the driving circuit 31 and the valve device 32 on the basis of the above-described computed data; the insertion holes are automatically formed at the preset positions based on the predetermined length of the slat 16; the slat material 6 is cut to a given length to form the slats 16; and at the same time the slats 16 are inserted through the ladder cords 15 in due order, thus automatically inserting predetermined sheets of the slats 16 through the ladder cords 15. Therefore, according to this blind fabricating apparatus 1, if the height of the blind to be fabricated and the length of the slat 16 are set with the help of the input keys 17, 19 of the controller 4, the insertion holes are formed at the predetermined positions based on the length of the slat 16, and furthermore, the slats 16 are obtained by cutting the slat material 6 to a predetermined length. A given number of sheets of the thus formed slats 16 are inserted through the ladder cords 15. Inasmuch as the above-described steps are automatically effected, even in case of fabricating multiple blinds which differ in height and have the slats that differ in length, what is needed is to merely input a height thereof and a length of the slat as well by means of the input keys 17, 19. With this step, it is feasible to readily insert given sheets of the slats 16 through the ladder cords 15.

If a condition under which the ladder cords 15 are distributed with respect to the insertion holes formed in the slats 16 is inputted as the number of sheets of the slats 16 by the use of the input key 21 of the controller 4, the CPU 27 actuates the second air cylinder 14*b* through the intermediary of the valve device 32 whenever, as in the case of the above-described embodiment, for instance, 20 sheets of the slats 16 are inserted through the ladder cords 15. As a result, the movable plate 38 is moved to either of the positions shown in FIGS. 11, 13, and the respective lifting bars 53*a*, 53*b*, 53*c* are shifted to either of the positions depicted by the solid and chain lines of FIG. 7, in which state the ladder cords 15 are distributed for every 20 sheets of the slats 16 into the right and left sides of the position 110 at which the insertion holes are disposed in order that the slat material 6 is inserted through the ladder cords 15. The ascending-descending cord is inserted into the insertion holes formed in the slats 16 having a multiplicity of steps which slats are, as described above, inserted through the ladder cords 15, thereby fabricating a blind. In this case, the ladder cords 15 are distributed for every 20 sheets of the slats 16 into the right and left sides of the ascending-descending cord.

Accordingly, so far as the blind fabricating apparatus 1 is concerned, if a desired number of sheets of the slats 16 is inputted by the input key 21 of the controller 4, it becomes possible to distribute the ladder cords 15 for every predetermined sheets of the slats 16 into the right and left sides of the insertion holes. When the ascending-descending cord is inserted into the insertion holes formed in such slats 16, the ladder cord 15 is retained by the ascending-descending cord. With this arrangement, it is feasible for the thus fabricated blind to prevent a deviation of the ladder cord 15 from the slats 16 when being utilized.

The slats 16 are inserted through the ladder cords 15 by the inserting machines 13, but this is contingent on such a process that the CPU 27 controlls the first air cylinder 14*a* and the feed rollers 9*a*, 9*b*.

Namely, in a state wherein the cam 41 is rotated by the first air cylinder 14*a* to the position depicted by the chain line of FIG. 6, the lifting bars 53*a*, 53*b*, 53*c* are situated lower than the slat inserting portions 61 of the stoppers 57*a*, 57*b*, viz., at the lowest positions shown by the solid lines of FIGS. 6, 7; and the first and second guide members 78, 82 are moved to the positions indicated by the solid lines of FIGS. 7, 11. At this time, the pointed end portion 78*a* of the second guide member 78, as shown in FIG. 14, enters between the longitudinal strings of the ladder cord 15, thus expanding the longitudinal strings outwards. In such a state, the CPU 27 arranges for the feed rollers 9*a*, 9*b* and the hole forming device 11 to operate, whereby the slat material 6 is successively transferred toward the inserting machines 13 while being formed with the insertion holes. After this process, in the respective inserting machines 13, the slat material 6 is, as shown in FIG. 7, led by the guide members 78, 82 via the inserting potion 61 provided between the stoppers 57*a*, 57*b* that are retained by the left supporting member 55 to the spaces between the expanded longitudinal strings of the ladder cord 15. Thereafter, the slat material 6 is led via the slat inserting portion 61 provided between the stoppers 57*a*, 57*b* that are retained by the right supporting member 55 to the right side thereof or to the next inserting machine 13.

As described above, on the occasion when the slat material 6 is inserted into the inserting machine 13, the first and second guide members 78, 82 are situated in fornt of each of the ladder cords 15 on the inserting channel for the slat material 6. The first guide member 78 positioned low guides the slat material 6 from the underside and at the same time expands the longitudinal strings of the ladder cord 15 outwards, thereby preventing the slat material 6 from being caught in the these strings. On the other hand, the second guide member 82 positioned high guides the slat material 6 from the topside. The inserting machine 13 is therefore capable of securely inserting the slat material through the ladder cord 15 while preventing the slate material 6 from being caught in the ladder cord 15.

The slat material 6 is, as explained above, inserted through the respective inserting machines 13 where the slat material 6 is fed by a predetermined length; and the slat material 6 is cut by the cutter 12 to a given length to form the slats 16. The CPU 27 actuates the first air cylinder 14*a*, and the cam 41 is rotated to the position illustrated in FIG. 5. The lifting bars 53*a*, 53*b*, 53*c* are, as shown in FIGS. 5, 8, moved higher than the stoppers 57*a*, 57*b*; and the first and second guide members 78, 82 are shifted to the positions shown in FIG. 10.

Upon rotation from the position depicted by the chain line of FIG. 6 to the position indicated by the solid line thereof, the cam shaft 88 of the first operating rod 75 makes a relative movement from the position 106 shown in FIG. 12 to the position 105 in the guide groove 89 of the cam 41. Resultingly, the first and second guide members 78, 82, as shown in FIGS. 8, 10, move and stay between the lifting bars 53*a*, 53*b* and the lifting bar 53*c*. In such a state, the cam 41 is further rotated to the position illustrated in FIG. 5, at which time a cam roller 52 is raised by the cam 41 and hence the lifting bars 53*a*, 53*b*, 53*c* are lifted to the positions illustrated in FIG. 8.

After this process, if the first air cylinder 14*a* is actuated and the cam 41 is made to rotate to the position depicted by the chain line of FIG. 6, the lifting bars 53*a*, 53*b*, 53*c*, contrary to the above-described step, descend to the positions indicated by the solid lines of FIG. 7; and the first and second guide members 78, 82 are then moved to the positions depicted by the solid lines of FIG. 7.

As described above, every inserting machine 13 arranges for the lifting bars 53*a*, 53*b*, 53*c* and for the first and second guide members 78, 82 to be actuated with the aid of the first air cylinder 14*a* through the intermediary of the cam 41. Consequently, the timing at which the lifting bars 53*a*, 53*b*, 53*c* and the first and second guide members 78, 82 are operated is invariably rendered immutable and hence such lifting bars and the guide members never butt against each other. By virtue of this arrangement, it is feasible to securely and smoothly insert the slats 16 through the ladder cords 15

Moreover, when the inserting machine 13 effects the insertion of the slats 16, the lifting bars 53*a*, 53*b*, 53*c* are lifted and concurrently the slats 16 are raised. At this moment, the ladder cord 15 is also raised by the slats 16, so that the tension pulley 64, as shown in FIG. 8, is rotated while resisting the spring force of the torsion coil spring 65; and the lateral strings of the ladder cord 15 finally come off from the protrudent member 68 , thereby rotationally returning the tension pulley 64 to the position shown in FIG. 7. In this state, the protrudent member 68 engages with the lateral string disposed one step low in order to tense the ladder cord 15 again.

Therefore, in time of effecting such inserting operations of the slats, the ladder cord 15 is constantly and adequately tensed by engaging the protrudent member 68 of the tension pulley 64 with the lateral strings thereof in due order. Thanks to this process, it is possible to certainly and smoothly insert the slats through the ladder cords 15, this invloving a prerequisite step wherein the first guide member 78, as shown in FIG. 14, securely expands the ladder cord 15. The configuration of the tension pulley 64 is characterized such that, as shown in FIG. 7, the axial core thereof is positioned at the left hand of the lifting bars 53*a*, 53*b*; the protrudent member 68 revolves round the axial core thereof with a small radius of gyration, thereby facilitating the engagement and the disengagement of the lateral strings of the ladder cord 15. Furthermore, the ladder cord 15 securely engages with the tension pulley 64 with the help of the movable roller 69 and the fixed roller 70 disposed underneath the tension pulley 64. If the movable roller 69 is, as indicated by the chain line of the Figure, made to rotate, it is possible to easily insert it between the tension pulley 64 and the respective rollers 69, 70.

In the above-described embodiment, the length of the slat 16 is set by means of the input key 17. It is, however, to be noted that the CPU 27 may compute the length of the slat 16 and the positions at which the insertion holes for the ascending-descending cord are formed by inputting the width of the blind instead of the length of the slat 16.

As many apparently widely different embodiments of this invention may be made without departing from the spirit and scope thereof, it is to be understood that the invention is not confined to the specific embodiments thereof except as defined in the appended claims.

What is claimed is:

1. An apparatus for fabricating a blind:

said blind having a plurality of horizontal slats, at least a pair of ladders with vertically spaced horizontal members to support said slats, said slats also having insertion holes for ascending-descending cords, and ascending-descending cords at said ladders through said holes in said slats;

said apparatus comprising: input devices for inputting and storing information with respect to the height of said blind and the length of a said slat; an arithmetic and logic computing means for receiving output signals of the stored information from the input devices for determining the number of steps of said slats which corresponds to the inputted height of said blind and corresponds to positions on said slats at which said insertion holes for the ascending-descending cords are formed;

and a slat inserting device for receiving output signals from the arithmetic and logic computing means and for cutting slat material to a predetermined length on the basis of the output signals of said arithmetic and logic computing means, for forming said insertion holes in each of the slats for said ascending-descending cord in said slats, and for inserting said slats through a plurality of said ladder cords.

2. An apparatus for fabricating a blind, said blind having a plurality of horizontal slats, at least a pair of ladders with vertically spaced horizontal members to support said slats, said slats also having insertion holes for ascending-descending cords, and ascending-descending cords at said ladders through said holes in said slats for said cords, said apparatus comprising:

a molding device for molding a tabular slat material in a crooked shape;

a slat inserting device including means for cutting slat material molded by said molding device to a predetermined length of slat, means for forming insertion holes in a said slat for said ascending-descending cords, and means for inserting said slats through a plurality of ladder cords extending in the upper and lower directions, said means for inserting comprises a plurality of said inserting means, each including guide means positioned to outwardly expand longitudinal strings of said ladder cords to dispose them to receive said slats in an inserting position when inserting said slats through said ladder cords; said guide means comprising a first guide member which is situated lower than said slats for guiding slats to the spaces between said lateral strings of said ladder cord, and for expanding said longitudinal strings of said ladder cords outwardly; and a second guide member which is situated higher than said slats for guiding said slats to the spaces between said lateral strings of said ladder cord.

3. An apparatus for fabricating a blind as set forth in claim 2, wherein each of said inserting means includes lifting means for moving said slats inserted through said ladder cords from the inserting positions thereof to the top side;

a cam means;

driving means for said cam means, a base board for each of said inserting means on which said driving means is mounted, said cam means driving said lifting means and said guide means.

4. An apparatus for fabricating a blind as set forth in claim 3, wherein said cam means comrpises a substantially semi-circular cam and a cam roller engaging with said cam, said cam roller being attached to a part of said lifting means.

5. An apparatus for fabricating a blind as set forth in claim 2, wherein said first guide member has an inclined surface which becomes higher as it approaches said ladder cord and is disposed in the inserting position and said second guide member has an inclined surface which becomes lower as it approaches said ladder cord and is disposed in the inserting position.

6. An apparatus for fabricating a blind, said blind having a plurality of horizontal slats, at least a pair of ladders with vertically spaced horizontal members to support said slats, said slats also having insertion holes for ascending-descending cords, and ascending-descending cords at said ladders through said holes in said slats for said cords;

said apparatus comprising:

a molding device for molding a tabular slat material in a crooked shape;

a slat inserting device including means for cutting slat material molded by said molding device to a predetermined length of slat, means for forming insertion holes in a said slat for said ascending-descending cords, and means for inserting said slats through a plurality of ladder cords extending in the upper and lower directions, said means for inserting comprises a plurality of said inserting means, each including guide means positioned to outwardly expand longitudinal strings of said ladder cords to dispose them to receive said slats in an inserting position when inserting said slats through said ladder cords; said guide means comprising a first guide member which is situated lower than said slats for guiding said slats to the spaces between said lateral strings of said ladder cord, and for expanding said longitudinal strings of said ladder cords outwardly; and a second guide member which is situated higher than said slats for guiding said slats to the spaces between said lateral strings of said ladder cord;

a cam means; driving means for said cam means, a base board for each of said inserting means on which said driving means is mounted, said cam means driving said lifting means and said guide means; said cam means comprises a substantial semi-circular cam and a cam roller engaging with said cam, said cam roller being attached to a part of said lifting means;

a moving member supported for movement on said base board, said moving member including said cam roller and being moved up and down together with said cam roller, said movement being synchronized with revolutions of said cam, said moving member also having an end adjacent and supporting at least one lifting member having a proximal end which is supported by said moving member.

7. An apparatus for fabricating a blind, said blind having a plurality of horizontal slats, at least a pair of ladders with vertically spaced horizontal members to support said slats, said slats also having insertion holes for ascending-descending cords, and ascending-descending cords at said ladders through said holes in said slats for said cords;

said apparatus comprising:

a molding device for molding a tabular slat material in a crooked shape;

a slat inserting device including means for cutting slat material molded by said molding device to a predetermined length of slat, means for forming insertion holes in a said for said ascending-descending cords, and means for inserting said slats through a plurality of ladder cords extending in the upper and lower directions, said means for inserting comprises a plurality of said inserting means, each including guide means positioned to outwardly expand longitudinal strings of said ladder cords to dispose them to receive said slats in an inserting position when inserting said slats through said ladder cords;

said guide means comprising:

a first guide member which is situated at the lower portion of said slats for guiding said slats to the spaces between said lateral strings of said ladder cord, and for simultaneously expanding said longitudinal strings of said ladder cords outwards; and a second guide member which is situated at the uppor portion of said slats for guiding said slats to the spaces between said lateral strings of said ladder cord, cam means including a guide groove formed in the outer peripheral surface of said cam; and a cam shaft for fitting in said guide groove, said cam shaft being so provided on said first guide member as to project therefrom and to be moved by said cam together with said first guide member;

driving means for said cam means, a base board for each of said inserting means on which said driving means is mounted, said cam means driving said lifting means and said guide means; said cam means comprises a substantial semi-circular cam and a cam roller engaging with said cam, said cam roller being attached to a part of said lifting means.

8. An apparatus for fabricating a blind as set forth in claim 7, wherein said first and second guide members have a transmission mechanism for transmitting an operation of said first guide member to said second guide member.

9. An apparatus for fabricating a blind, said blind having a plurality of horizontal slats, at least a pair of ladders with vertically spaced horizontal members to support said slats, said slats also having insertion holes for ascending-descending cords, and ascending-descending cords at said ladders through said holes in said slats for said cords;

said apparatus comprising:

a molding device for molding a tabular slat material in a crooked shape;

a slat insertion device including means for cutting slat material molded by said molding device to a predetermined length of slat, means for forming insertion holes in a said slat for said ascending-descending cords, and means for inserting said slats through a plurality of ladder cords extending in the upper and lower directions, said means for inserting comprises a plurality of said inserting means, each of said inserting means having lifting means for lifting said slats inserted through said ladder cords by engaging with said ladder cords, and a horizontal driving means for alternately moving said lifting means to side portions of said insertion holes for said ascending-descending cords which holes are formed in said slats when inserting said slats through said ladder cords.

10. An apparatus for fabricating a blind as set forth in claim 9, wherein said horizontal driving means consists of a movable member rotatably provided on said inserting machine, said movable member supporting said lifting means, and of a cylinder means for reciprocating said movable member.

11. An apparatus for fabricating a blind, said blind having a plurality of horizontal slats, at least a pair of ladders with vertically spaced horizontal members to support said slats, said slats also having insertion holes for ascending-descending cords, and ascending-descending cords at said ladders through said holes in said slats for said cords;

said apparatus comprising:

a molding device for molding a tabular slat material in a crooked shape;

a slat inserting device including means for cutting slat material molded by said molding device to a predetermined length of slat, means for forming insertion holes in a said slat for said ascending-descending cords, and means for inserting said slats through a plurality of ladder cords extending in the upper and lower directions, said means for inserting comprises a plurality of said inserting means, each of said inserting means including a tension imparting means which is so provided as to correspond to each of said ladder cords underneath the inserting positions at which said slats are inserted through said ladder cords.

12. An apparatus for fabricating a blind as set forth in claim 11, wherein each of said tension imparting means invloves a rotatable tension pulley constituted by: a shaft; a protrudent member jutting out from said shaft and engaging with said lateral strings of said ladder cord; a spring force imparting means for imparting the spring force so that said protrudent member arranges for said ladder cord to tense in the lengthwise direction thereof; and a stopping means for stopping said protrudent member at the position where said ladder cord tenses.

13. An apparatus for fabricating a blind as set forth in claim 12, wherein said stopping means consists of a stoppage shaft protruding from a part of said tension pulley and a stoppage member provided on a part of said inserting machine so that said stoppage member can engage with said stoppage shaft.

* * * * *